United States Patent [19]

Shioi et al.

[11] Patent Number: 5,796,436
[45] Date of Patent: Aug. 18, 1998

[54] VIDEO DATA STORING DEVICE AND METHOD FOR CODING VIDEO DATA BASED UPON DETERMINING WHETHER OR NOT VIDEO DATA CONFORMS TO A PREDETERMINED STANDARD

[75] Inventors: Masahiro Shioi, Chiba; Takeshi Makiyama, Kashiwa; Keiichi Hibi, Matsudo; Jiro Nakabayashi, Urawa; Tsuneaki Iwano, Tokyo; Osamu Nakamura, Han-no; Youji Kanada, Tokyo; Tsuneko Kura, Sagamihara; Takashi Oshima, Tokyo, all of Japan

[73] Assignees: Sharp Kabushiki Kaisha, Osaka; Nippon Telegraph & Telephone Corporation, Tokyo, both of Japan

[21] Appl. No.: 713,639

[22] Filed: Sep. 13, 1996

[30] Foreign Application Priority Data

Sep. 14, 1995 [JP] Japan .................................. 7-236759

[51] Int. Cl.⁶ ............................ H04N 5/917; H04N 7/26
[52] U.S. Cl. ........................ 348/409; 386/111; 386/112; 371/30
[58] Field of Search ............................ 348/415, 416, 348/409, 384, 714, 715, 720; 386/21, 46, 94, 113, 111, 112; 371/20.1, 21.1, 30, 33, 37.3, 40.2

[56] References Cited

U.S. PATENT DOCUMENTS

| 5,323,187 | 6/1994 | Park ............................... 348/405 |
| 5,473,366 | 12/1995 | Imaeda et al. . |
| 5,508,747 | 4/1996 | Lee ................................ 348/441 |
| 5,528,284 | 6/1996 | Iwami et al. ..................... 348/13 |
| 5,528,606 | 6/1996 | Kondo et al. ................. 371/37.4 |
| 5,534,937 | 7/1996 | Zhu et al. ....................... 348/446 |
| 5,537,440 | 7/1996 | Eyuboglu et al. .............. 375/245 |

FOREIGN PATENT DOCUMENTS

| 0637888A2 | 2/1995 | European Pat. Off. . |
| 0661880A2 | 7/1995 | European Pat. Off. . |
| 2278752 | 12/1994 | United Kingdom . |

OTHER PUBLICATIONS

William Stallings, Ph.D., Data And Computer Communications, pp. 164–197 and 326–336, 1985.

Le Gall, MPEG: A Video Compression Standard for Multimedia Applications, Communications of the ACM, pp. 47–58, Apr. 1991.

Sharon et al., Accurate Modeling of H.261 VBR Video Source for Packet Transmission Studies, IEEE pp. 1904–1909, May 1995.

*Primary Examiner*—Tommy P. Chin
*Assistant Examiner*—David R. Vincent

[57] ABSTRACT

If received coded video-data includes data with an error unable to be decoded or data disagreeing with ITU-T recommendation H.261 (e.g., the number of bits per frame exceeds the limit defined by the recommendation), it must be stored with due countermeasures taken against error and inadaptable data, which allows the stored data to be effectively reproduced. Received coded video-data is decoded by a transmission-line decoding portion and divided into frames by a data dividing portion. Thereafter it is decoded by an information-source decoding portion and then intraframely encoded by a intraframe coding portion. According to a signal from a bit-counting portion showing that the number of bits in one frame of coded video-data exceeds the limit defined by ITU-T recommendation H.261 or anomalous signal of a frame image decoded by the information source decoding portion, a frame-processing control portion decides how to store each frame and controls a storable data transfer portion to select intraframe-coded data and transfer the selected data to a data storage.

12 Claims, 5 Drawing Sheets

VIDEO DATA STORING DEVICE AND METHOD FOR CODING VIDEO DATA BASED UPON DETERMINING WHETHER OR NOT VIDEO DATA CONFORMS TO A PREDETERMINED STANDARD

BACKGROUND OF THE INVENTION

The present invention relates to a video-data storing device which receives data video-data from a counterpart terminal over a transmission line, stores the received coded video-coded intact (without decoding) into a storage and transmits the stored coded video-data when reproducing it. More particularly, it relates to a video storing device which is provided with a device for coping with the case of receiving coded video-data that does not conform to the recommendation H.261 made by ITU-T (International Telecommunication Union).

Recently, with the spread and progress of digital communications networks, e.g., ISDN (Integrated Services Digital Networks) together with the advance of image processing technology and the development of high-speed digital signal processing methods, there has been an increasing demand for video-communication services. Representative real-time video-communication services are currently available for use with video communication services and video conferencing services. A growing user interest is now directed to use of video storage type communication services for providing many unspecified users with video information at any unspecified time. This kind of service uses a data-coding system, communication procedure and data multiplexing method according to ITU-T recommendations because it must provide many unspecified users with information services.

In the ITU-T recommendation H. 261 defining a video encoding method, an information source encoder of a video-codec according to the ITU-T recommendation H.261 comprises a coding control portion, a transforming portion, a quantizing portion, an inverse quantizing portion, an inverse transforming portion, a motion-compensating image memory and an in-loop filter. The coding control portion controls an amount of coded data. The transforming portion performs two-dimensional discrete-cosine-transformation of input data by block of 8×8 pixels to develop into frequency range information. The quantizing portion digitizes a signal in the direction of its level to save a data amount. The inverse quantizing portion performs the quantizing operation in reverse to the quantizing portion. The inverse transforming portion performs the transforming operation in reverse to the transforming portion. The motion-compensating image memory detects a motion vector by detecting a movement from a current transmittable frame and a proceeding frame. The in-loop filter eliminates high-pass component distortion resulting from interframe prediction.

The information source encoding device produces coded video-data from an input video-signal by applying a hybrid coding method that is a combination of an interframe prediction coding for compressing the data amount of the input video-signal using redundancy of the video in the time-base direction with an orthogonal transform coding method for compressing the data amount of the input video-signal using redundancy of the video in the spatial direction. The interframe prediction coding method determines a difference between a succeeding signal and a current signal as a prediction error signal and encodes said prediction error signal. This method is called "interframe coding".

If the interframe coding might bring a large difference signal, it is preferred to encode the frame by itself, rather than the interframe coding. This method is called "intraframe coding".

With the interframe coding method, it is needed to prepare coded data referring to a preceding frame because of using a differential signal between a current frame and a preceding frame. In reproducing the video signal from the coded data at a receiving terminal, it is therefore needed to use coded data of the precedent frame besides coded data of the current frame. On the contrary, the intraframe coding method encodes a frame without referring to any other frame. Consequently, the receiving terminal can reproduce the video signal from the received coded data by decoding just received frame data without referring to any other frame data.

A conventional storage type communication system for providing a video storage-and-delivery service includes audiovisual terminals, a digital transmission network, a video data storing device, a data storage, a transmission-line decoding portion, a data dividing portion, an information source decoding portion, an intraframe coding portion and a storable data transfer portion.

The transmission-line decoding portion decodes video-data received over the transmission line and the data dividing portion divides the output decoded data into data per frame that represents one element of the hierarchical structure of coded video-data. The frames into which coded data was divided are decoded to the original video signal by the information source decoding portion. At that time, only a first frame to be first stored is encoded again in the intraframe mode and then stored. All proceeding frames are stored as outputted from the data dividing portion.

The first frame at beginning of storing framed data is thus intraframely coded and can be finely reproduced at the receiving terminal regardless of its inconformity to the ITU-T recommendation H.261.

A sequence of coded data, however, may become unable to be decoded if an error arose in a transmission line with a result of corruption of data.

The ITU-T recommendation H.261 limits the number of bits in one frame of coded video-data, i.e., 256 kbpf (kbits per frame) if a video-signal format is CIF (Common Intermediate Format), and 64 kbpf if a video signal format is QCIF (Quarter CIF). This is because the decoder is designed for a specified capacity of a buffer for receiving data.

If the received coded video-data is unable to be decoded or a frame whose bit-length exceeds the limit defined by the ITU-T recommendation H.261, a conventional storing device decodes said data by a transmission-line decoder, divides the data into frames and stores the frames with no countermeasure. Consequently, frames that do not meet the recommendation are transmitted to a counterpart terminal which, however, can not decode the received video-data.

SUMMARY OF THE INVENTION

In view of the foregoing circumstances, the present invention was made to provide a video storing device which is capable of storing coded video-data in such a way that effective countermeasures can be taken if any received data can not be decoded and/or is inadaptable (e.g., with a bit length per frame over the recommended limit value) and the same countermeasures can be applied to the video-data including the data with an error and/or informal data when reproducing the stored data for further use.

It is an object of the present invention to provide a video data storing device, which comprises data dividing means for dividing received coded video-data into data per frame, information source decoding means for restoring video-information by decoding the coded video-data, intraframe coding means for intraframely encoding video-information restored by the information source decoding means and video-data transferring means for transferring the received coded video-data or intraframely re-encoded video-data prepared by the intraframe encoding means to a data storage, wherein control-signal deciding means is provided for detecting the inconformity of frame data from the data dividing means to ITU-T recommendation H.261 and deciding a control signal selectable thereat, and frame-processing control means is also provided for outputting the decided control signal selected according to the decision of the control signal deciding means to the video-data transferring means, said control signal being capable of causing the video-data transferring means not to store the received coded video-data of the inadaptable frame and to store the data outputted from the intraframe coding means. The frame processing control means detects the inconformity of the received coded video-data to the ITU-T recommendation H.261, decides a control signal for selecting either of the received coded video-data (frame) and intraframely re-encoded video-data (frame) to be stored, and then it outputs the decided control signal to the storable data transfer means. Consequently, the received data that contains an error and/or inadaptable frame can be stored in the state conforming to the recommendation. Countermeasures against the erroneous data and inadaptable data can be applied when reproducing the stored data.

Another object of the present invention is to provide a video-data storing device in which the control-signal deciding means decides a control signal by recognizing the inconformity of the frame structure of video-information restored by the information-source decoding means to the ITU-T recommendation H.261. With the abnormality of the decoded image, which was judged to be the consequence of an error which arose in a transmission line, the device encodes again the decoded image information but in the intraframe mode to make the storable data be adapted to the recommendation.

Another object of the present invention is to provide a video-data storing device in which the control-signal deciding means is provided with bit-counting means for counting the number of bits per frame of the received coded video-data and deciding the inconformity of video-information restored by the information source decoding means when the counted bit-length of any frame exceeds a frame bit-length limit of the coded video-data according to the ITU-T recommendation H.261.

In this device, the bit-counting means counts the number of bits per frame of coded video-data, discriminates whether the count of bits exceeds or does not exceed the limit of bit-length of one frame, which is defined by the recommendation, and the frame processing control means outputs a control signal selected according to the discrimination result. Namely, the bit-counting means and the frame processing control means co-operate to detect an inadaptable frame of received coded video-data and interframely re-encode it in order to be stored as adapted to the recommendation. Consequently, no data-frame disagreeing with the recommendation can be stored and, therefore, coded video-data always conforming to the recommendation can be transmitted for reproducing the data at an end terminal.

Another object of the present invention is to provide a video-data storing device in which it can transmit a command requesting a counterpart terminal to update a video-data (frame) when having recognized the inconformity of the received data to the ITU-T recommendation H.261. In response to the command, the counterpart terminal transmits an intraframely coded video-data (frame). Accordingly, the device can not only maintain video-data conformable to the ITU-T recommendation H.261 but can also realize fast restoring of the received video without distortion, even if it received any inadaptable video-data.

PREFERRED EMBODIMENT OF THE INVENTION

Figure 1:
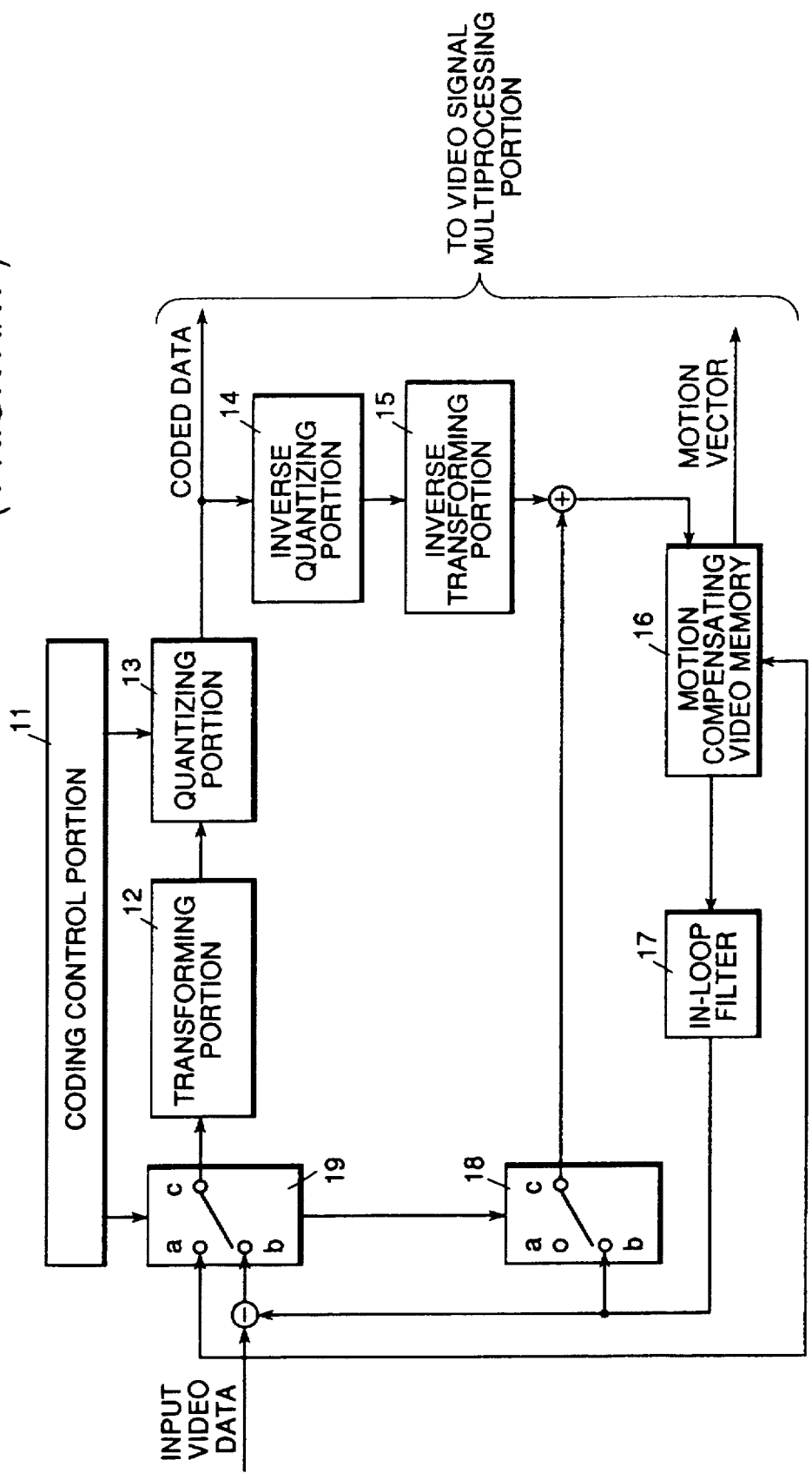
FIG. 1 is a block diagram of an information source decoder of a video-codec according to the ITU-T recommendation H. 261.

A summary of the ITU-T recommendation H. 261 defining a video encoding method is as follows: FIG. 1 is a block diagram of an information source encoder of a video-codec according to the ITU-T recommendation H.261, which encoder comprises a coding control portion 11, a transforming portion 12, a quantizing portion 13, an inverse quantizing portion 14, an inverse transforming portion 15, a motion-compensating image memory 16 and an in-loop filter 17. The coding control portion 11 controls an amount of coded data. The transforming portion 12 performs two-dimensional discrete-cosine-transformation of input data by block of 8×8 pixels to develop into frequency range information. The quantizing portion 13 digitizes a signal in the direction of its level to save a data amount. The inverse quantizing portion 14 performs the quantizing operation in reverse to the quantizing portion 13. The inverse transforming portion 15 performs the transforming operation in reverse to the transforming portion 12. The motion-compensating image memory 16 detects a motion vector by detecting a movement from a current transmittable frame and a proceeding frame. The in-loop filter 17 eliminates high-pass component distortion resulting from interframe prediction.

The information source encoding device produces coded video-data from an input video-signal by applying a hybrid coding method that is a combination of an interframe prediction coding for compressing the data amount of the input video-signal using redundancy of the video in the time-base direction with an orthogonal transform coding method for compressing the data amount of the input video-signal using redundancy of the video in the spatial direction. The interframe prediction coding method determines a difference between a succeeding signal and a current signal as a prediction error signal and encodes said prediction error signal.

This method is called "interframe coding" that corresponds to the case when contacts b and c at two switches 18, 19 of FIG. 1 are connected to each other. If the interframe coding might bring a large difference signal, it is preferred to encode the frame by itself, rather than the interframe coding. This method is called "intraframe coding" that is realized when contacts a and c at two switches 18, 19 of FIG. 1 are connected to each other.

With the interframe coding method, it is needed to prepare coded data referring to a preceding frame because of using a differential signal between a current frame and a preceding frame. In reproducing the video signal from the coded data at a receiving terminal, it is therefore needed to use coded data of the precedent frame besides coded data of the current frame. On the contrary, the intraframe coding method encodes a frame without referring to any other frame. Consequently, the receiving terminal can reproduce the video signal from the received coded data by decoding just received frame data without referring to any other frame data.

Figure 2:
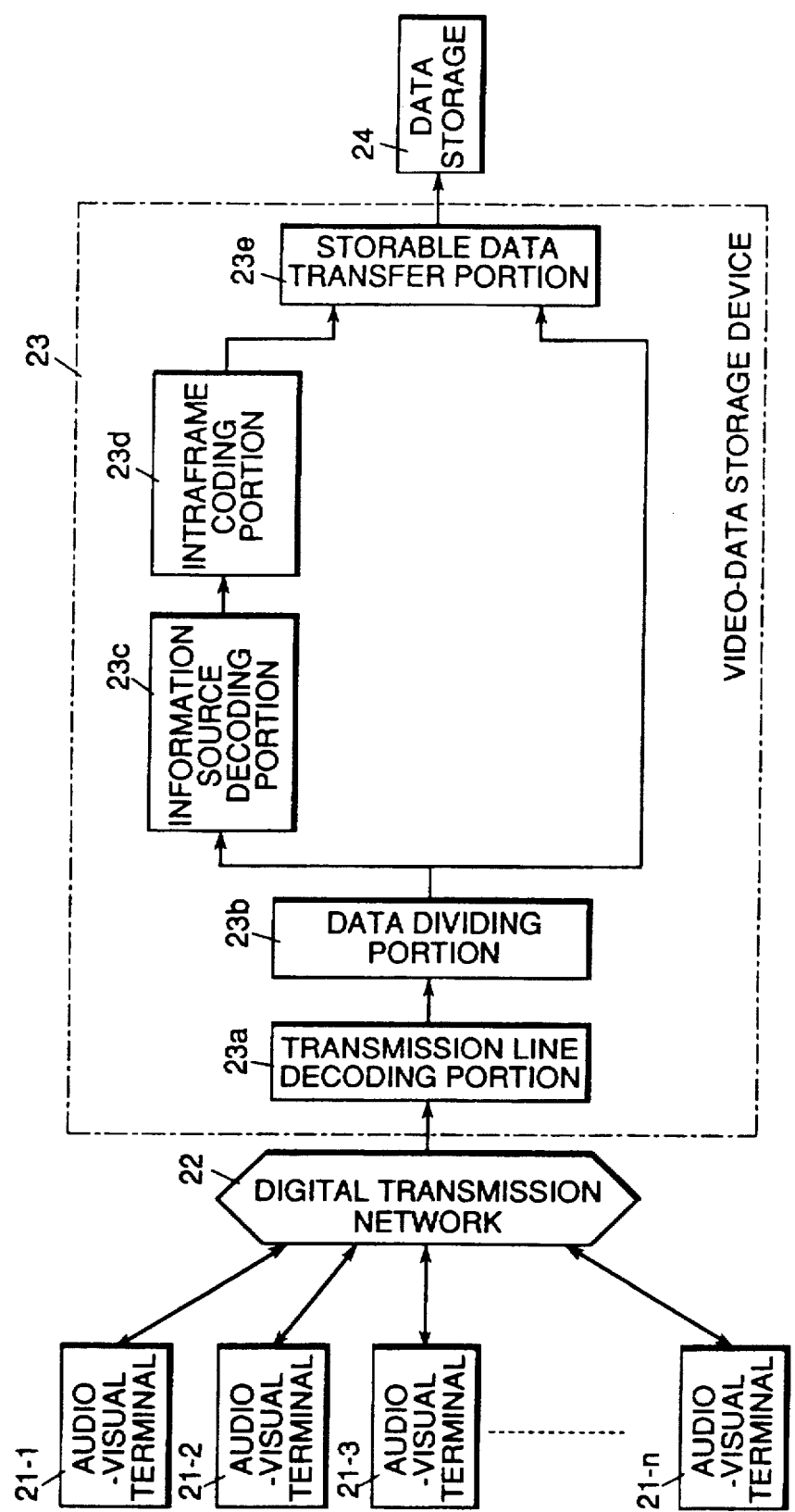
FIG. 2 is a construction view of a conventional video-data storage device.

FIG. 2 is a schematic illustration showing a configuration of a conventional storage type communication system for providing a video storage-and-delivery service, which includes audiovisual terminals 21-1, 21-2, 21-3 . . . 21-n, a digital transmission network 22, a video data storing device 23, which comprises a transmission-line decoding portion 23a, a data dividing portion 23b, an information source decoding portion 23c, an intraframe coding portion 23d and a storable data transfer portion 23e, and a data storage 24.

The transmission-line decoding portion 23a decodes video-data received over the transmission line and the data dividing portion 23b divides the output decoded data into data per frame that represents one element of the hierarchical structure of coded video-data. The frames into which coded data was divided are decoded to the original video signal by the information source decoding portion 23c. At that time, only a first frame to be first stored is encoded again in the intraframe mode and then stored. All proceeding frames are stored as outputted from the data dividing portion 23b.

The first frame at beginning of storing framed data is thus intraframely coded and can be finely reproduced at the receiving terminal regardless of its inconformity to the ITU-T recommendation H.261.

A sequence of coded data, however, may become unable to be decoded if an error arose in a transmission line with a result of corruption of data.

The ITU-T recommendation H.261 limits the number of bits in one frame of coded video-data, i.e., 256 kbpf (kbits per frame) if a video-signal format is CIF (Common Intermediate Format), and 64 kbpf if a video signal format is QCIF (Quarter CIF). This is because the decoder is designed for a specified capacity of a buffer for receiving data.

If the received coded video-data is unable to be decoded or a frame whose bit-length exceeds the limit defined by the ITU-T recommendation H.261, a conventional storing device decodes said data by a transmission-line decoder, divides the data into frames and stores the frames with no countermeasure. Consequently, frames that do not meet the recommendation are transmitted to a counterpart terminal which, however, can not decode the received video-data.

In view of the foregoing circumstances, the present invention was made to provide a video storing device which is capable of storing coded video-data in such a way that effective countermeasures can be taken if any received data can not be decoded and/or is inadaptable (e.g., with a bit length per frame over the recommended limit value) and the same countermeasures can be applied to the video-data including the data with an error and/or informal data when reproducing the stored data for further use.

Figure 3:
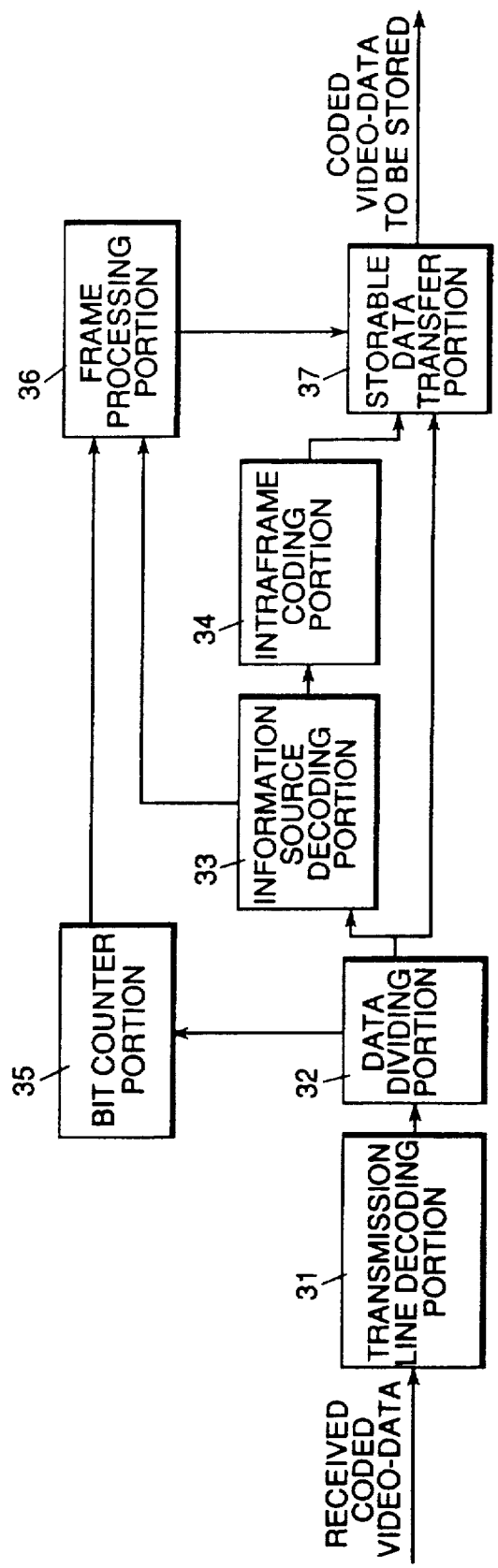
FIG. 3 is a block diagram showing a video-data storing device embodying the present invention.

FIG. 3 is a block diagram of a video storing device.

A transmission-line decoding portion 31 receives coded video-data and decodes the received coded video-data. The data dividing portion 32 connected to the transmission-line decoding portion 31 divides the coded video-data into data per frame. An information-source decoding portion 33 connected to the data dividing portion 32 decodes the coded video data to restore the original video information, one copy of which is used for examining whether it conforms to a coding law defined by the ITU-T recommendation H.261. The other restored information is encoded again but in the intraframe coding mode by an intraframe coding portion 34. A bit-counting portion 35 connected to the data dividing portion 32 counts bit-length of coded video data per frame and examines whether the measured bit-length exceeds the limit bit-length defined by the ITU-T recommendation H.261. A frame processing control portion 36, which is connected to the bit-counting portion 35 and the information-source decoding portion 33, decides how to store the frames in a data storage. A data transfer portion 37, which is connected to the data dividing portion 32, the intraframe coding portion 34 and the frame processing control portion 36, transfers the coded video-data to the data storage.

Figure 4:
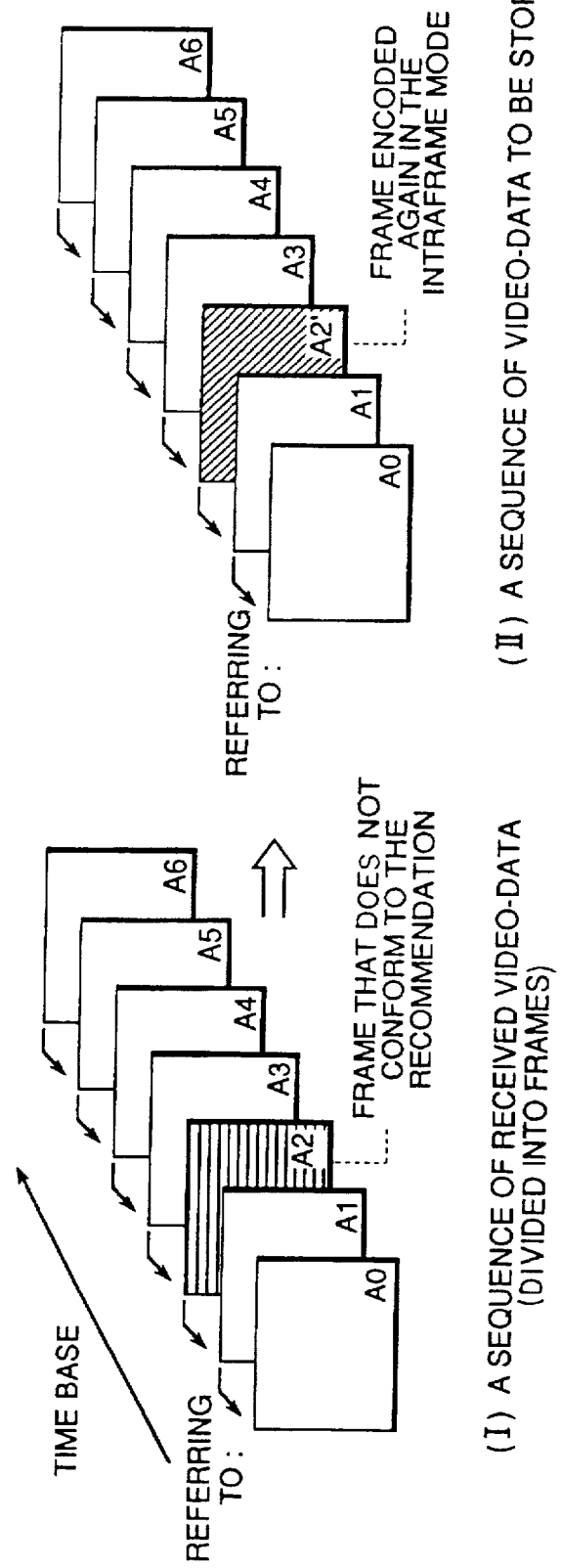
FIG. 4 is a view for explaining the operation of a video-data storing device of the present invention when having received video frame that does not conform to the ITU-T recommendation H.262.

FIG. 4 is a view for explaining the processing actions of the video data storing device when having received a frame which is not in conformity to the ITU-T recommendation H.261. FIG. 4(I) shows a sequence of video-data received and divided into frames and FIG. 4(II) shows a sequence of the divided data (frames) to be stored. If a frame (A2 frame in the shown case) disagreeing with the ITU-T recommendation H.261 was found in a sequence of the received video-data, it is encoded again but in the intraframe mode to conform to the recommendation and then is stored as a conformable frame (A2' frame). All succeeding frames (A3 and so on) of the received coded video-data are stored as they were received.

Figure 5:
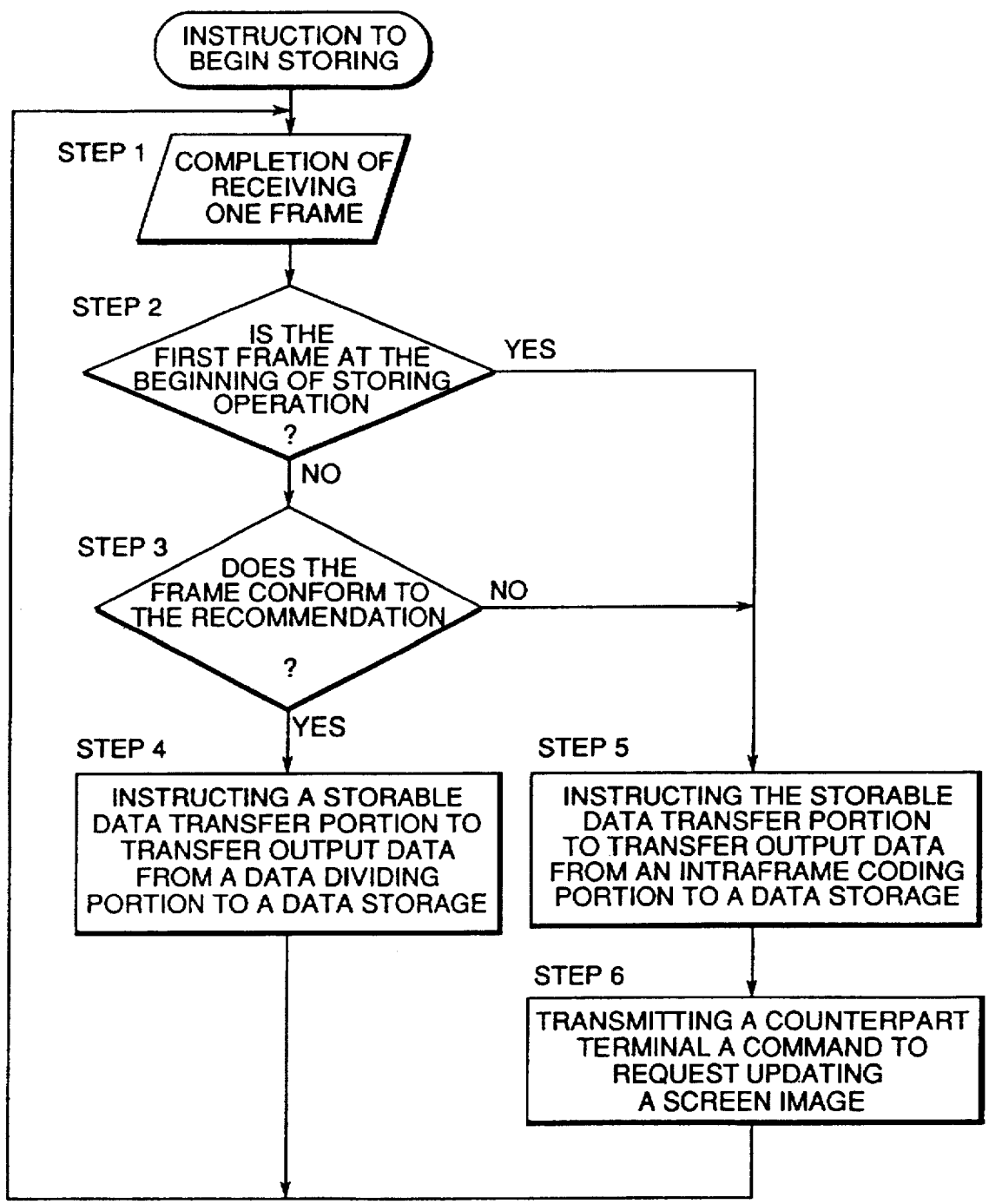
FIG. 5 is a flow chart of a frame processing control means for deciding storable data to be sent to a video-data storage in a video-data storing system according to the present invention.

FIG. 5 is a flow chart for explaining the operation of a frame-processing control device for deciding data to be transferred to a data storage according to the present invention.

After receiving a data-storing starting command, the frame-processing control unit waits for a notice of receiving a frame from a bit-counting portion (Step S1). Upon receipt of the notice, the control unit recognizes the first storable frame (Step S2), instructs a storable data transfer portion to transfer output data from an intraframe encoding portion to a data storage (Step S5) and sends a counterpart terminal a command requiring transmission of an image data (Step S6). Then, the control unit waits for a notice of completing receipt of a next frame from a bit-counting portion (Step S1). Upon receipt of the notice, the control unit recognizes the conformity of the received frame (Step S3) and instructs the storable data transfer portion to transfer the received data frame from the dividing portion to the data storage (Step S4). After this, the control unit returns into waiting state (Step S1). Upon receipt of the notice of receiving a next frame data, the control unit, if the frame disagrees with the recommendation (Step S3), instructs a storable data transfer portion to transfer output data from the intraframe coding portion to the data storage (Step S5) and sends a counterpart terminal an audiovisual communication control-signal and a command requiring transmission of a video-frame, which command is defined by the ITU-T recommendation H.230 on audiovisual communication control-signals and message-signals (Step S6). Then, the control unit returns to waiting for a notice of having received a next frame and will repeat the above-mentioned operations.

As is apparent from the foregoing, the present invention offers the following advantages: (1) A video-data storing device according to the present invention is provided with a frame processing control portion and is capable of detecting the inconformity of a received frame to the ITU-T recommendation H.261, generating a control signal by the frame processing portion according to the detection signal, encoding the received inadaptable frame again but in the intraframe mode and storing the intraframe coded frame, thereby storing the coded video-data conformable to the recommendation. This also assures transmission of the video-data conformable to the recommendation when reproducing the stored video-image. The countermeasure applied to the inadaptable video-data can be also used when reproducing the stored video-data. (2) A video-data storing device according to the present invention is capable of, besides the facilities defined in item (1), detecting abnormality of the decoded image resulted from a transmission error, and intraframely encoding said video information, enabling the information to be maintained as data conformable to the recommendation. (3) A video-data storing device according to the present invention has, beside the facilities defined in items (1) and (2), a bit-counting portion and is capable of detecting a frame of the received coded video-data, having length of which exceeds the limit defined by the recommendation, according to the count of the bit-counting portion, and informing a frame processing portion of the received frame disagreeing with the recommendation, instructing that the disagreeing frame is not to be stored and to intraframely encode the frame and store the interframe coded data. By doing so, it is possible to always store coded video frames conformable to the recommendation as well as to transmit the coded video-data conformable to the recommendation when reproducing the stored video-data. (4) A video-data storing device according to the present invention is capable of, besides the features defined in items (1), (2) and (3), sending a counterpart terminal a command for updating the current image, which command is defined by the ITU-T recommendation H.230, when recognized the inconformity of the received data to the ITU-T recommendation H.261. By doing so, it is possible to restore the received image from distortion in the shortest period.

We claim:

1. A video-data storing device comprising:
   data dividing means for receiving interframe coded video-data and providing a frame of interframe coded video-data;
   information source decoding means for restoring video-information by decoding the frame of interframe coded video-data;
   intraframe coding means for encoding the restored frame of video-information in an intraframe coding mode;
   video-data transferring means for transferring one of the frame of interframe coded video-data and the encoded restored frame of video-information for data storage;
   control-signal deciding means for determining whether or not the frame of interframe coded video-data conforms to a predetermined standard and for issuing a control signal indicative of such a determination; and
   frame-processing control means for receiving the control signal from the control-signal deciding means, wherein the video-data transferring means is controlled, in response to said frame-processing control means receiving the control signal indicating that the frame of interframe coded video-data fails to conform to the predetermined standard, to store the encoded restored frame of video information outputted from the intraframe coding means in place of the frame of interframe coded video-data.

2. The video-data storing device as defined in claim 1, wherein the control-signal deciding means judges whether or not the restored frame of video-information restored by the information source decoding means conforms to the predetermined standard.

3. The video-data storing device of claim 1, wherein the control-signal deciding means includes bit-counting means for counting a bit length of the frame of interframe coded video-data and for judging the frame of interframe coded video-data to be irregular requiring intraframe coding when the counted bit length of the frame of interframe coded video-data exceeds a predetermined limit.

4. The video-data storing device of claim 1, wherein upon recognizing that the frame of interframe coded video-data fails to conform to the predetermined standard, the video-data storing device transmits a command requesting a video-sending terminal to update video-data to promptly eliminate irregularity of the received interframe coded video-data.

5. The video-data storing device of claim 2, wherein the control-signal deciding means includes bit-counting means for counting a bit length of the frame of interframe coded video-data and for judging the frame of interframe coded video-data to be irregular requiring intraframe coding when the counted bit length of the frame of interframe coded video-data exceeds a predetermined limit.

6. The video-data storing device of claim 2, wherein upon recognizing that the frame of interframe coded video-data fails to conform to the predetermined standard, the video-data storing device transmits a command requesting a video-sending terminal to update video-data to promptly eliminate irregularity of the received interframe coded video-data.

7. The video-data storing device of claim 3, wherein upon recognizing that the frame of interframe coded video-data fails to conform to the predetermined standard, the video-data storing device transmits a command requesting a video-sending terminal to update video-data to promptly eliminate irregularity of the received interframe coded video-data.

8. A video-data storing method comprising the steps of:
   (a) receiving a frame of interframe coded video-data;
   (b) decoding the frame of interframe coded video-data to restore a frame of video-information;
   (c) encoding the frame of restored video-information in an intraframe coding mode;
   (d) determining whether or not the frame of interframe coded video-data conforms to a predetermined standard; and
   (e) storing the frame of intraframe encoded video-information in response to determining that the frame of interframe coded video-data does not conform to the predetermined standard in said step (d) and storing the frame of interframe coded video-data in response to determining that the frame of interframe coded video-data conforms to the predetermined standard in said step (d).

9. The video-data storing method of claim 8, wherein a plurality of frames of interframe coded video-data are received in said step (a) and the method further comprises the step of:

(f) dividing the received plurality of frames of interframe coded video-data into frames prior to said step (b).

10. The video-data storing method of claim 8, wherein said step (d) includes determining whether or not the restored frame of video-information of said step (b) conforms to the predetermined standard.

11. The video-data storing method of claim 8, wherein said step (d) includes counting bit length of the frame of interframe coded video-data and determining that the frame of interframe coded video-data does not conform to the predetermined standard when the measured bit-length of the frame of interframe coded video-data exceeds a predetermined limit.

12. The video-data storing method of claim 10, wherein said step (d) includes counting bit length of the frame of interframe coded video-data and determining that the frame of interframe coded video-data does not conform to the predetermined standard when the measured bit-length of the frame of interframe coded video-data exceeds a predetermined limit.

* * * * *